US007181478B1

(12) United States Patent
Korson et al.

(10) Patent No.: US 7,181,478 B1
(45) Date of Patent: Feb. 20, 2007

(54) METHOD AND SYSTEM FOR EXPORTING FLIGHT DATA FOR LONG TERM STORAGE

(75) Inventors: Shannon Lee Korson, Middletown, OH (US); Sharon Ann Garls, Hamilton, OH (US); Michael Dean Fullington, West Chester, OH (US); Scott Allen Goertemiller, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 199 days.

(21) Appl. No.: 09/637,442

(22) Filed: Aug. 11, 2000

(51) Int. Cl.
*G06F 17/30* (2006.01)

(52) U.S. Cl. .................. 707/204; 707/201; 707/202

(58) Field of Classification Search ........ 707/201–202, 707/204, 104.1, 100, 101; 73/116; 701/3–14
See application file for complete search history.

(56) References Cited

U.S. PATENT DOCUMENTS

| | | | | | |
|---|---|---|---|---|---|
| 4,604,711 | A | * | 8/1986 | Benn et al. ................... 701/14 |
| 4,729,102 | A | | 3/1988 | Miller, Jr. et al. .......... 364/424 |
| 5,018,069 | A | * | 5/1991 | Pettigrew ..................... 701/35 |
| 5,408,412 | A | * | 4/1995 | Hogg et al. ................... 701/33 |
| 5,528,490 | A | | 6/1996 | Hill ............................. 364/403 |
| 5,726,911 | A | * | 3/1998 | Canada et al. .............. 318/434 |
| 5,758,355 | A | * | 5/1998 | Buchanan ..................... 707/1 |
| 5,761,625 | A | * | 6/1998 | Honcik et al. .............. 340/963 |
| 5,793,649 | A | * | 8/1998 | Take et al. ................... 702/113 |
| 5,826,252 | A | | 10/1998 | Wolters, Jr. et al. ............ 701/1 |
| 5,841,255 | A | | 11/1998 | Canada et al. .............. 318/490 |
| 5,869,752 | A | * | 2/1999 | Klauber et al. ............. 701/101 |
| 5,870,765 | A | * | 2/1999 | Bauer et al. .................. 707/10 |
| 5,974,349 | A | * | 10/1999 | Levine ......................... 701/29 |
| 6,047,165 | A | | 4/2000 | Wright et al. ................. 455/66 |
| 6,092,008 | A | * | 7/2000 | Bateman ...................... 701/14 |
| 6,115,656 | A | * | 9/2000 | Sudolsky ....................... 701/3 |
| 6,173,159 | B1 | * | 1/2001 | Wright et al. ............. 455/66.1 |
| 6,181,990 | B1 | * | 1/2001 | Grabowsky et al. .......... 701/14 |
| 6,199,008 | B1 | * | 3/2001 | Aratow et al. ............. 701/120 |
| 6,216,066 | B1 | * | 4/2001 | Goebel et al. ................ 701/29 |
| 6,259,977 | B1 | * | 7/2001 | Mayer et al. ................. 360/31 |
| 6,278,913 | B1 | * | 8/2001 | Jiang ............................. 701/3 |
| 6,353,734 | B1 | * | 3/2002 | Wright et al. ................. 455/98 |
| 6,408,259 | B1 | * | 6/2002 | Goebel et al. .............. 702/183 |
| 6,463,439 | B1 | * | 10/2002 | Dahlberg ................... 707/100 |

OTHER PUBLICATIONS

Arkov et al. "Aircraft Engine Condition Monitoring: Stochastic Identification and Neural Networks". 1997. Artificial Neural Networkds Jul. 7-9, 1997. Conference Publication No. 440. IEE. 1997. pp. 295-299.*

* cited by examiner

*Primary Examiner*—Khanh B. Pham
(74) *Attorney, Agent, or Firm*—William Scott Andes; Armstrong Teasdale LLP

(57) ABSTRACT

The availability of flight data used in the maintenance of aircraft engines is enhanced by exporting data from the database of an engine condition monitoring program to a long term database. The data export is accomplished by first reading a time file to determine the last date and time that data was successfully exported to the destination database. The program database is then searched for data that is new or changed since the last successful export. Any data found in searching the program database is retrieved and exported to the destination database. After a successful export, the date and time of the successful export is updated in the time file.

14 Claims, 2 Drawing Sheets

METHOD AND SYSTEM FOR EXPORTING FLIGHT DATA FOR LONG TERM STORAGE

BACKGROUND OF THE INVENTION

This invention relates generally to processing aircraft flight data and more particularly to exporting processed flight data for long term storage.

Gas turbine engines used for powering aircraft in flight are routinely subject to various maintenance procedures as part of their normal operation. To aid in the provision of such engine services, aircraft are commonly provided with onboard engine performance monitoring equipment that collects relevant flight data during operation. In some instances, the flight data is collected manually. Airlines commonly use an engine condition monitoring program to analyze the flight data and track the engine's performance. In simple terms, the program monitors the flight data and if a significant change in the flight data is detected, then the program issues an "alert" indicating that maintenance action may be needed.

Generally, such engine condition monitoring programs only retain the last 50–60 data points collected. While the program can be configured to never delete data, the database and program efficiency would quickly become untenable because of the limits of the program's data storage capacity. Thus, most users allow the program to automatically delete the data, retaining only the most recent data points.

However, having an engine's entire life cycle history would be very useful in the overall maintenance of the engine. Being able to evaluate an engine's entire life history would provide valuable additional information on what is normal and abnormal for the engine, as well as providing useful insight into the production and overhaul work practices. Engine condition monitoring programs do have the capability to save past history in the form of compression points. Compression points comprise smoothed values for the first data point of a given time period, such as every month. Unfortunately, these compression points are not very helpful for long term analyses because they generally do not accurately reflect an engine's performance over a lengthy time period.

Accordingly, it would be desirable to be able to retain all collected flight data without compromising the efficiency of the engine condition monitoring program.

BRIEF SUMMARY OF THE INVENTION

The above-mentioned need is met by the present invention, which provides a method and system for exporting data from the database of an engine condition monitoring program to a destination database. The data export is accomplished by first reading a time file to determine the last date and time that data was successfully exported to the destination database. The program database is then searched for data that is new or changed since the last successful export. Any data found in searching the program database is retrieved and exported to the destination database. After a successful export, the date and time of the successful export is updated in the time file.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
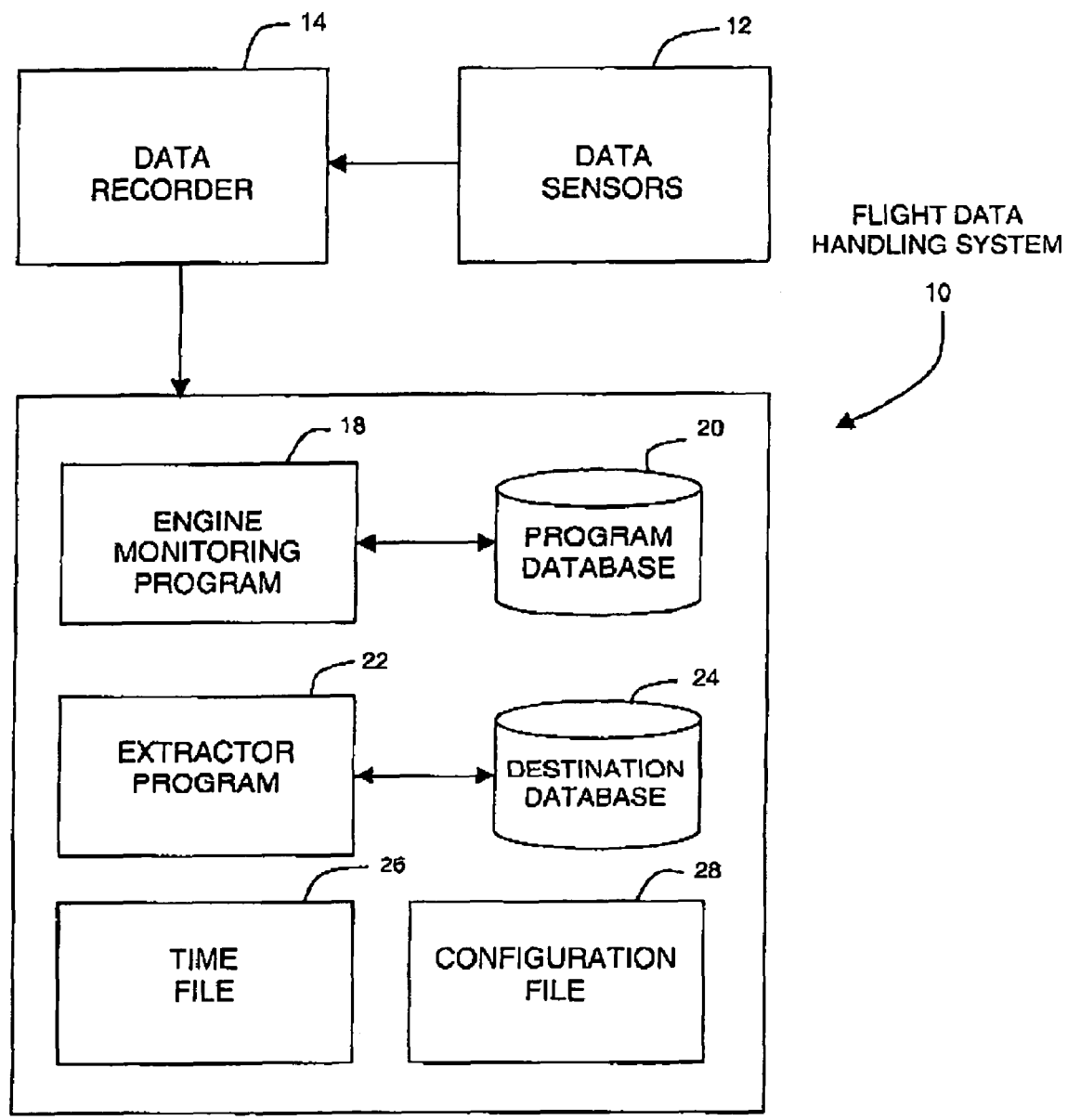
FIG. 1 is a schematic block diagram of an aircraft flight data handling system including means for exporting flight data to a long term storage database.

Referring to the drawings wherein identical reference numerals denote the same elements throughout the various views, FIG. 1 shows a block diagram of a flight data handling system 10 for processing flight data collected onboard an aircraft. The system 10 includes a set of conventional data sensors 12 distributed throughout the aircraft to sense selected parameters that are indicative of the overall performance and/or condition of the aircraft and/or its engines. The data sensors 12 can comprise any group of sensors that monitor aircraft and engine parameters of interest. In addition to aircraft parameters such as air speed and altitude, engine parameters would typically include exhaust gas temperature, engine fuel flow, core speed, compressor discharge pressure, turbine exhaust pressure, fan speed, and the like. The flight data sensed by the data sensors 12 are recorded, either manually or electronically, onboard the aircraft in a data recorder 14. As used herein, "data recorder" refers to any type of data recording means and can include electronic recording devices, such as a conventional flight data acquisition unit, as well as written logs into which the flight data are entered by a human operator after being read from cockpit instrumentation.

The flight data recorded in the data recorder 14 are downloaded to a ground-based computer system 16, which can be any type of computer system such as a PC. Manually recorded data would be manually entered into the computer system 16 using standard input means such as a keyboard (not shown). Electronically recorded data could be transferred by any available means, such as a bus connection, wireless transmission or diskette transfer. This data download would typically take place after completion of a flight. Alternatively, electronically recorded data could be downloaded to the computer system 16 during flight operations using wireless transmission for remote, real-time processing.

The computer system 16 includes an engine condition monitoring program 18 that processes the downloaded flight data. Specifically, the program 18 receives the input data from the aircraft and engine data sensors 12 and calculates raw output data for both the aircraft and engine input data by comparing to parametric baselines. The program 18 also generates smoothed output data from the aircraft and engine raw output data. Any change in the output from previous smoothed levels or levels over a predetermined limit may be indicative of a possible engine condition that requires maintenance. Thus, the program issues an "alert" indicating that maintenance action may be needed.

The program 18 includes a database 20 which stores all of the flight data (i.e., engine input data, engine raw output data, engine smoothed output data, aircraft input data, aircraft raw output data, and aircraft smoothed output data). The program database 20 also stores engine configuration data, aircraft configuration data, alert data, initialization data, and compressed data. These various types of data are stored in different tables within the program database 20. Typically, the program database 20 has a different table for engine input data, engine raw output data, engine smoothed output data, aircraft input data, aircraft raw output data, and aircraft smoothed output data. A process indicator table is provided for identifying the status of each record within each of these tables. That is, the process indicator table contains a status indicator for each record that instructs the program 18 how to operate. For example, records having newly processed data would have a "REPORT" status indicator signifying a need to report the new data, and previously entered records that have been changed or corrected would have a "RE-REPORT" status indicator signifying a need to re-report the altered data.

The program database 20 also has flight data, alert data, initialization data, compression data and configuration data tables. The flight data table contains key information regarding the aircraft's flights, including an aircraft identification number and data time stamps. The alert data table contains data relating to any alerts that are issued by the program 18. The initialization data table contains aircraft/engine initialization data, which is typically the first ten data points collected. The initialization data table also includes primary key values (i.e., data relating to aircraft identification, flight time, flight phase and so on). The compressed data table contains compression points, which are smoothed values for the first data point of every month, or some other time period. The configuration data tables contain aircraft and engine configuration data.

The computer system 16 further includes an extractor program 22, a destination database 24, and two external files: a time file 26 and a configuration file 28. As is described in detail below, the extractor program 22 extracts from the program database 20 all data that is either new or changed since the last successful export, and exports this extracted data to the destination database 24. The time file 26 is an ASCII file to which the date and time of the last successful execution of the extractor program 22 is written. The configuration file 28 provides data mapping information between the tables in the program and destination databases 20 and 24.

Figure 2:
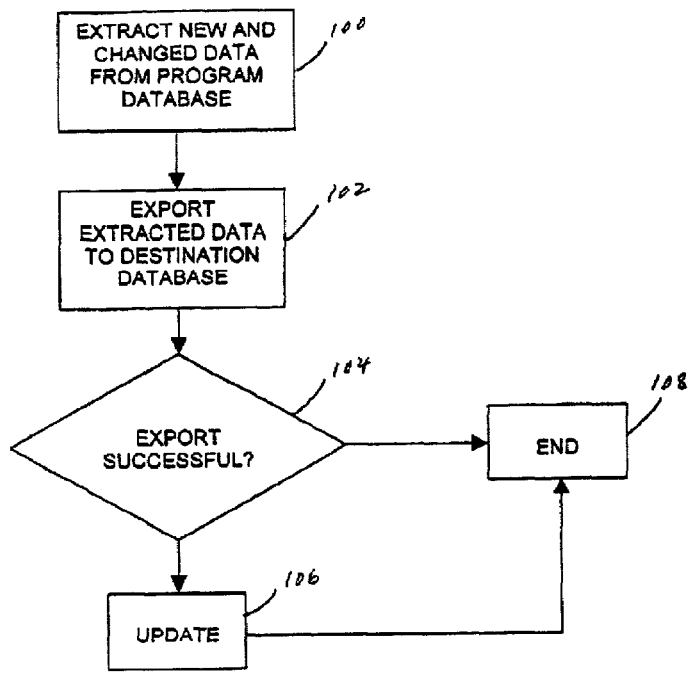
FIG. 2 is a flow chart illustrating an overall method for extracting and exporting aircraft flight data.

Turning now to FIG. 2, a general methodology for extracting and exporting flight data on the program database 20 is described. After the data has been processed by the engine condition monitoring program 18, the extractor program 22 extracts from the program database 20 all data that is either new or changed since the last successful export, as indicated at block 100. The data extracted from the program database 20 includes any desired set of data parameters available on the program database 20. This will typically include engine configuration data, aircraft configuration data, engine input data, engine raw output data, engine smoothed output data, aircraft input data, aircraft raw output data, aircraft smoothed output data, alert data, initialization data, and compressed data.

Next, at block 102, the extracted data is exported to the destination database 24. To do this, the extractor program 22 reads the external configuration file 28 to map the extracted data parameters to their respective table and parameter names in the destination database 24. The extractor program 22 also has the capability to add some simple parameters to further categorize the data. For example, an alert count for a particular reading can be used in the destination database 24.

At block 104, the extractor program 22 inquires as to whether the extracted data has been successfully exported to the destination database 24. If the export was successful, then the extractor program 22 updates the date and time of the export in the time file 26 for tracking purposes as indicated at block 106. The process is then completed as indicated at block 108. If the export is not successful (for example there is a failure or problem retrieving data from the program database 20 or inserting records into the destination database 24), then the process will be stopped as indicated at block 108. The export date and time in the time file 26 will not be updated; consequently, the extracted data will be re-extracted and exported in a subsequent execution of the process.

Figure 3:
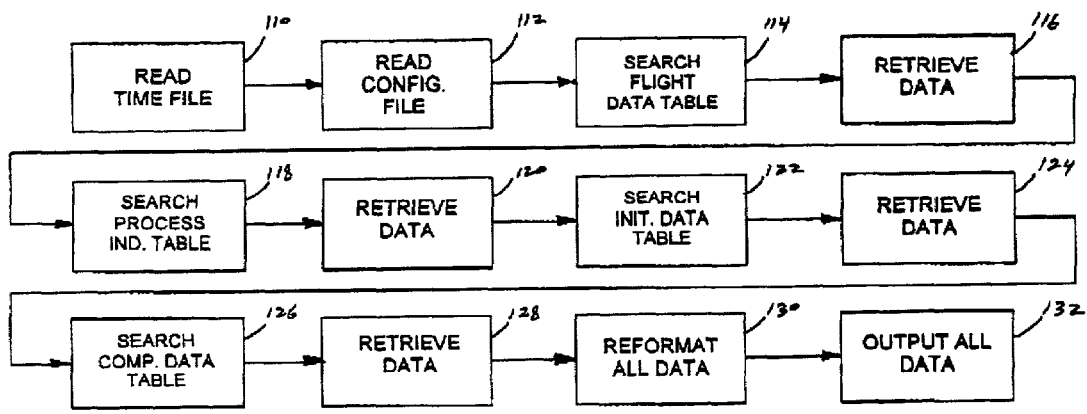
FIG. 3 is a detailed flow chart illustrating the extracting and exporting methodology of the method of FIG. 2.

Referring to FIG. 3, the method for extracting and exporting data from the program database 20 (i.e., the steps identified at blocks 100 and 102 of FIG. 2) is described in more detail. The extractor program 22, which performs extraction of the data, is executed manually by the system user or automatically by an execution program. Preferably, the extractor program 22 is run after every flight for which the program 18 is run, but the program 22 can also be executed on a scheduled basis, such as once a week or once a day.

As indicated at block 110 of FIG. 3, the extractor program 22 will first read from the external time file 26 the date and time when the last successful execution of the extractor program 22 terminated. If no date and time is found, the extractor program 22 will use a default date and time, which is typically the first date and time that the user began using the engine condition monitoring program 18 in its maintenance operations. The extractor program 22 at block 112 will then read from the external configuration file 28 the table name and column name in the destination database 24 and map or correlate each table and column in the program database 20 to a table and column in the extractor program 22. This will reduce the need to recompile the extractor program 22 whenever a change is made to either of the program or destination databases 20 or 24.

At block 114, the extractor program 22 will search the flight data table of the program database 20 for flight data that was added or modified after the date and time read from the time file 26. For each flight data record found, the extractor program 22 will retrieve all parameters from the aircraft input, aircraft raw output, and aircraft smoothed output tables, as indicated at block 116. Then for each engine position, the extractor program 22 will also retrieve all parameters from the engine input, engine raw output, and engine smoothed output tables. Finally, the extractor program 22 retrieves all alert data from the alert output table of the program database 20. Also, the status indicator in the process indicator table will be set to "DONE" after each record is processed.

Next, the extractor program 22 will search the process indicator table of the program database 20 for newly processed or reprocessed flight records (i.e., flight records indicated by a status indicator of "REPORT" or "RE-REPORT") as indicated at block 118. For each reprocessed flight record found, the extractor program 22 will retrieve all parameters from the aircraft input, aircraft raw output, and aircraft smoothed output tables, as indicated at block 120. Then for each engine position, the extractor program 22 will also retrieve all parameters from the engine input, engine raw output, and engine smoothed output tables. Finally, the extractor program 22 retrieves all alert data from the alert output table of the program database 20. Also, the status indicator in the process indicator table will be set to "DONE" after each table is processed.

After completing the extraction of flight data, the extractor program 22 searches the initialization data table of the program database 20 at block 122. At block 124, the extractor program 22 retrieves initialization data by finding the primary key values from the initialization data table for which the character value field is equal to "EXTRACT". The character value field is an existing field in the initialization data table that is initially set to "EXTRACT" by the engine condition monitoring program 18. The extractor program 22 will process each primary key value set and retrieve all the initialization parameter data for that primary key value set. After successful storage of the initialization data in the destination database 24, the character value field will be reset to "NULL" for each affected primary key value set.

Next, at block 126, the extractor program 22 will search the compression data table of the program database 20. At block 128, the extractor program 22 retrieves compression data by finding the primary key values from the compression data table for which the character value field is equal to "EXTRACT". Like the initialization data table, the compression data table contains character value fields that are initially set to "EXTRACT" by the engine condition monitoring program 18 when the primary key values are processed. The extractor program 22 will process each primary key value set and retrieve all the compression parameter data. After successful storage of the compression data in the destination database 24, the character value field will be reset to "NULL" for each affected primary key value set.

The above steps retrieve all data that are new since the date and time read from the time file 26. The searches of the various database tables will also retrieve re-smoothed, re-alerted and backdated data. That is, if a data record that had previously been exported to the destination database 24 is subsequently changed in the program database 20, then the extractor program 22 will update this data record in the destination database 24. Also the extractor program 22 automatically updates the destination database 24 in the case of a backdated engine install. For example, if an engine on the aircraft is changed, data entered prior to removal date of the previous engine will apply to that engine and will need to be extracted from the destination database 24. Data associated with the old engine but collected after the removal date is also deleted from the destination database 24.

As each flight data record is retrieved at block 116, each reprocessed flight record is retrieved at block 120, each initialization data record is retrieved at block 124, and each compression data record is retrieved at block 128, the parameter data will be re-formatted as needed for the destination database 24 as indicated at block 130. Then, at block 132, all of the reformatted data is output to the destination database 24, thereby completing the extraction and export process. If there are any problems inserting the reformatted data into the destination database 24, then extractor program 22 will search the configuration tables of the program database 20 for aircraft and engine configuration data that is new or changed since the date and time read from the time file 26. Such configuration data will be retrieved and exported to the destination database 24. If there is still a problem exporting any of the data, then the process will be stopped as discussed above at blocks 104 and 108 of FIG. 2. If all data is successfully extracted and exported to the destination database 24, the extractor program 22 will write the date and time the processing has terminated to the external time file 26 as discussed above at block 106 of FIG. 2.

The foregoing has described a method and system of exporting data from an engine condition monitoring program to long term storage. While specific embodiments of the present invention have been described, it will be apparent to those skilled in the art that various modifications thereto can be made without departing from the spirit and scope of the invention as defined in the appended claims.

What is claimed is:

1. A method of exporting data from an engine condition monitoring program database to a long term storage destination database, said method comprising:

downloading data recorded in a flight data recorder to a program database retaining only recent data in a ground-based computer system having an engine condition monitoring program, wherein the engine condition monitoring program generates smoothed output data, and using said program database for storage and analysis;

after said downloading of the data recorded, extracting from said program database data that is new or changed since a last date and time that data was successfully exported to the long term storage destination database;

reading an external configuration file that provides data mapping information between the program database and the long term storage destination database;

mapping the program database to the long term storage destination database, wherein said data comprises engine configuration data, aircraft configuration data, engine input data, engine raw output data, engine smoothed output data, aircraft input data, aircraft raw output data, aircraft smoothed output data, alert data, initialization data and compressed data, and wherein said extracted data includes re-alerted and backdated data;

exporting said extracted data to said long term storage destination database; and after a new successful export, updating an external time file with a new date and time of said new successful export.

2. In a computer system having an engine condition monitoring program, a program database comprising a number of data tables data tables, and a long term storage destination database, a method of exporting data from said program database to said destination database, said method comprising:

downloading data recorded in a flight data recorder to said program database for short term storage and analysis;

generating smoothed output data from the engine condition monitoring program;

reading an external time file to determine a last date and time that data was successfully exported to said destination database;

searching said program database for data that is new or changed since said last successful export;

after said downloading of the data recorded, retrieving the new or changed data found in searching said program database;

reading an external configuration file that provides data mapping information between the program database and the long term storage destination database;

mapping the program database to the long term storage destination database, wherein said data comprises engine configuration data, aircraft configuration data, engine input data, engine raw output data, engine smoothed output data, aircraft input data, aircraft raw output data, aircraft smoothed output data, alert data, initialization data and compressed data, and wherein said retrieved data includes re-smoothed, re-alerted, and backdated data;

exporting said retrieved data to said long term storage destination database; and after a new successful export, updating said external time file with a new date and time of said new successful export.

3. The method of claim 2 wherein said program database includes a flight data table, and a number of engine data tables and aircraft data tables and said step of searching said program database comprises searching said flight data table for flight data that is new or modified since said last successful export.

4. The method of claim 3 wherein said step of retrieving data comprises retrieving data from said engine data tables and said flight data tables for each flight data record found in said flight data table.

5. The method of claim 4 further comprising providing each of said engine data tables and said aircraft engine tables with an indication that data retrieval is completed after said flight data is retrieved from each table.

6. The method of claim 2 wherein said program database includes a process indicator table, and a number of engine data tables and aircraft data tables and said step of searching said program database comprises searching said process indicator table for reprocessed flight data that is changed since said last successful export.

7. The method of claim 6 wherein said step of retrieving data comprises retrieving data from said engine data tables and said aircraft data tables for each reprocessed flight data record found in said process indicator table.

8. The method of claim 7 further comprising providing each of said engine data tables and said aircraft engine tables with an indication that data retrieval is completed after said reprocessed flight data is retrieved from each table.

9. The method of claim 2 wherein said program database includes an initialization data table, and said step of searching said program database comprises searching said initialization data table for initialization data that is changed since said last successful export.

10. The method of claim 9 wherein said step of retrieving data comprises retrieving initialization data found in said initialization data table.

11. The method of claim 10 further comprising providing said initialization data table with an indication that data retrieval is completed after said initialization data is retrieved from said initialization table.

12. The method of claim 2 wherein said program database includes a compression data table, and said step of searching said program database comprises searching said compression data table for compression data that is changed since said last successful export.

13. The method of claim 12 wherein said step of retrieving data comprises retrieving compression data found in said compression data table.

14. The method of claim 13 further comprising providing said compression data table with an indication that data retrieval is completed after said compression data is retrieved from said compression table.

* * * * *